United States Patent
Chowdhary et al.

(10) Patent No.: US 12,491,619 B2
(45) Date of Patent: Dec. 9, 2025

(54) ANTI-KICKBACK FEATURE FOR POWER TOOLS

(71) Applicant: STMicroelectronics International N.V., Geneva (CH)

(72) Inventors: Mahesh Chowdhary, San Jose, CA (US); Krishna Chaitanya Palle Hayagreeva, Cupertino, CA (US)

(73) Assignee: STMicroelectronics International N.V., Geneva (CH)

( * ) Notice: Subject to any disclaimer, the term of this patent is extended or adjusted under 35 U.S.C. 154(b) by 158 days.

(21) Appl. No.: 18/451,762

(22) Filed: Aug. 17, 2023

(65) Prior Publication Data
US 2025/0058449 A1    Feb. 20, 2025

(51) Int. Cl.
*B25F 5/00*    (2006.01)
*H02K 7/14*    (2006.01)

(52) U.S. Cl.
CPC .............. *B25F 5/001* (2013.01); *H02K 7/145* (2013.01)

(58) Field of Classification Search
CPC ................................ B25F 5/001; H02K 7/145
See application file for complete search history.

(56) References Cited

U.S. PATENT DOCUMENTS

| | | | | |
|---|---|---|---|---|
| 6,479,958 | B1* | 11/2002 | Thompson | B25F 5/00 388/937 |
| 7,182,148 | B1* | 2/2007 | Szieff | B25H 1/0078 173/171 |
| 11,192,232 | B2 | 12/2021 | Goble | |
| 2007/0084613 | A1* | 4/2007 | Zhang | B25B 21/00 173/1 |
| 2019/0126456 | A1* | 5/2019 | Abbott | H02K 7/003 |
| 2019/0128474 | A1* | 5/2019 | Sun | B27B 9/00 |
| 2020/0080843 | A1* | 3/2020 | Chowdhary | G01C 19/32 |
| 2020/0114502 | A1* | 4/2020 | Goble | G01C 19/08 |
| 2020/0276680 | A1 | 9/2020 | Green et al. | |
| 2021/0059649 | A1 | 3/2021 | Hunt et al. | |
| 2021/0154820 | A1* | 5/2021 | Bianco | G01C 19/00 |
| 2021/0283759 | A1* | 9/2021 | Merget | F16P 3/12 |
| 2022/0105616 | A1 | 4/2022 | Wirnitzer et al. | |

* cited by examiner

*Primary Examiner* — Michelle Lopez
(74) *Attorney, Agent, or Firm* — Seed Intellectual Property Law Group LLP

(57) ABSTRACT

The present disclosure is directed to kickback detection for devices, such as handheld drills. Kickback is detected using a gyroscope and an accelerometer, and is detected at the end of each of a plurality of time windows. At the end of each time window, kickback is detected based on, for example, a variance of a norm of gyroscope measurements. False kickback detections are then removed based on, for example, a minimum and a mean of accelerometer measurements. Kickback detection is completed before the next time window begins.

19 Claims, 3 Drawing Sheets

ANTI-KICKBACK FEATURE FOR POWER TOOLS

BACKGROUND

Technical Field

The present disclosure is directed to prevention of kickback for power tools.

Description of the Related Art

Power tools, such as handheld drills and drivers, drill presses, and grinders, often suffer from kickback during operation when the tool motor does not have enough power to continue operation. For example, for drills, kickback typically occurs when the drill bit becomes stuck in the material being drilled, which causes the tool itself to violently swing or spin. Consequently, the operator of the tool may be injured.

Some power tools include anti-kickback technology to reduce the risk of kickback. For example, many power tools employ mechanical and electrical clutch mechanisms that detect the torque of the tool, and shuts the tool motor off based upon the detected torque. However, mechanical and electrical clutches have several drawbacks. For example, mechanical clutches have limited response and cycling time, and cannot be actuated more than a few times in a minute. Further, actuation on the mechanical clutch causes wear on the clutch itself and operator fatigue. Increased temperatures due to continuous operation of tool may also cause clutch slippage and increase wear and tear of mechanical components of the tool. Electrical clutches have improved response and cycling time compared to mechanical clutches. However, electrical clutches do not provide physical feedback and the feel of engagement of drill to the operator, which is important for user experience.

BRIEF SUMMARY

The present disclosure is directed to kickback detection for devices, such as handheld drills. Kickback occurs, for example, when the bit of the device becomes stuck in the material being worked upon, causing a sudden and violent kickback motion (e.g., twisting) of the device itself. Operation of the device is, for example, stopped upon detecting a kickback. Kickback detection is executed, for example, on a smart sensor with a built in machine learning core to execute decision trees on the onboard memory.

Kickback is detected using a gyroscope and an accelerometer, and is detected at the end of each of a plurality of time windows. Each time window includes, for example, 10 measurement samples from the gyroscope and the accelerometer. As a result, kickback detection is performed for every 10 measurement samples.

At the end of each time window, kickback is detected based on, for example, a variance of a norm of gyroscope measurements. False kickback detections are then removed based on algorithm features, for example, a minimum and a mean of accelerometer measurements. Kickback detection is completed before the next time window begins.

BRIEF DESCRIPTION OF THE SEVERAL VIEWS OF THE DRAWINGS

In the drawings, identical reference numbers identify similar features or elements. The size and relative positions of features in the drawings are not necessarily drawn to scale.

DETAILED DESCRIPTION

In the following description, certain specific details are set forth in order to provide a thorough understanding of various aspects of the disclosed subject matter. However, the disclosed subject matter may be practiced without these specific details. In some instances, well-known structures and methods of manufacturing and operation of power tools, electronic devices, electronic components, and sensors have not been described in detail to avoid obscuring the descriptions of other aspects of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

As discussed above, power tools often suffer from kickback during operation when the tool motor does not have enough power to continue operation. For example, drills typically suffer from kickback when the drill bit becomes stuck in the material being drilled, and the drill itself instead violently swings or spins.

The present disclosure is directed to a device and method for kickback detection and prevention of kickback of the device. In contrast to current solutions, the kickback detection disclosed herein utilizes a gyroscope and an accelerometer to detect a kickback. The kickback detection disclosed herein has low power consumption and processing time, and minimizes false kickback detections caused by, for example, signal noise from normal operation of the device.

Figure 1:
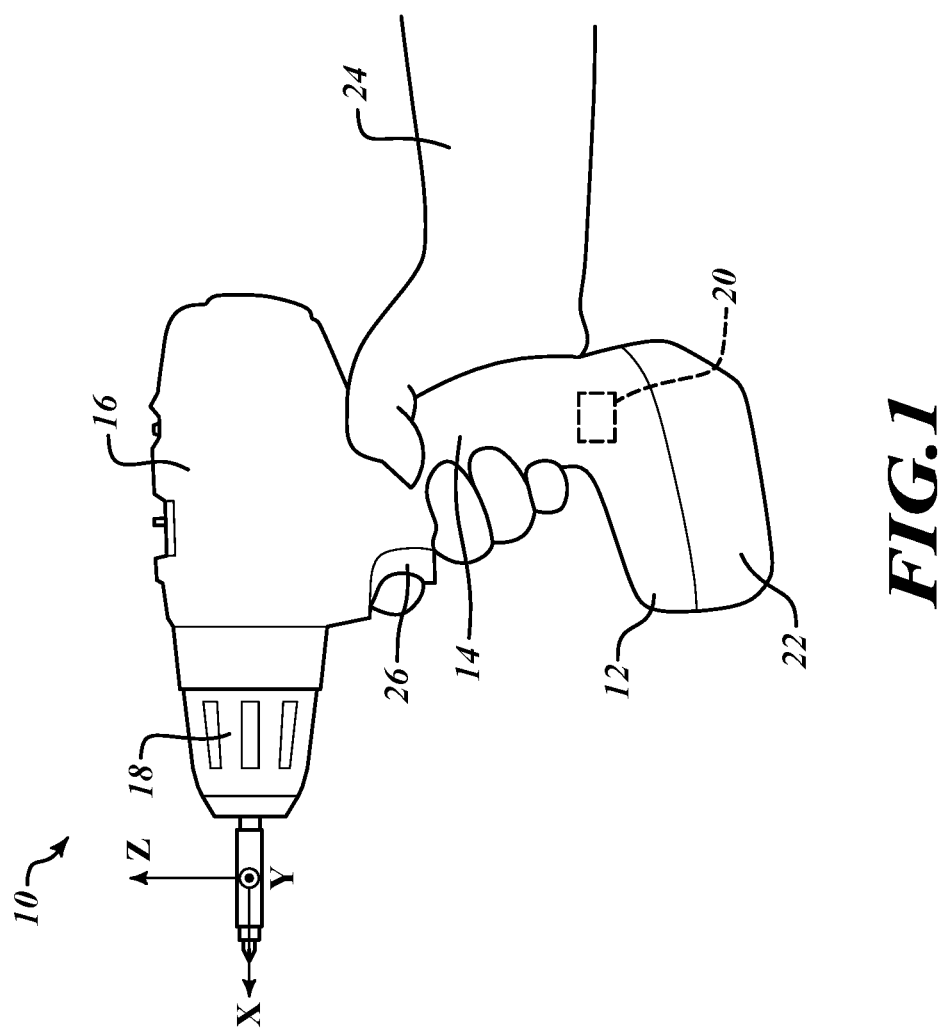
FIG. 1 is a device according to an embodiment disclosed herein.

FIG. 1 is a device 10 according to an embodiment disclosed herein.

The device 10 is an electronic device that is configured to detect and prevent kickback of the device 10. In this embodiment, the device 10 is a power handheld drill or driver. However, the device 10 may be any type of electronic device that may potentially suffer from kickback. For example, the device 10 may be another type of power tool, such as a drill press or a grinder.

The device 10 includes a base 12, a handle 14, and a motor 16, a chuck 18, and a multi-sensor device 20.

The base 12 provides a support for the device 10, and includes various electronic components, including the multi-sensor device 20, of the device 10. The base 12 is also coupled to a power source 22 for the device 10. The power source 22 provides electrical power for electronic components of the device, such as the motor 16 and the multi-sensor device 20. In one embodiment, as shown in FIG. 1, the power source 22 is a rechargeable battery that may be removed from the device 10. In one embodiment, the power source 22 is a wired connection that receives electricity from an electrical outlet.

The handle 14 is coupled to the base 12, and provides a grip for an operator or user 24 of the device 10. The handle 14 includes a trigger 26 that starts and stops a drill/driving process by the device 10. For example, the operator 24 squeezes the trigger 26 to start the drill/driving process, and lets go of the trigger 26 to stop the drill/driving process.

The motor 16 is coupled to the handle 14, and turns or rotates the chuck 18. As the motor 16 rotates the chuck 18, a bit (e.g., drill bit, screwdriver bit, etc.) loaded in the chuck 18 also rotates. The motor 16 may be any type of motor that provides a rotating motion for the chuck 18, such as a brushless motor and a brushed motor.

The chuck 18 is coupled to the motor 16, and holds or clamps various bits to be used in the device 10. For example, a drill bit is mounted in the chuck 18 to perform a drill process, and a screwdriver bit is mounted in the chuck 18 to perform a screwing process. As discussed above, a bit loaded in the chuck 18 rotates as the motor 16 rotates the chuck 18.

The multi-sensor device 20 is positioned in the base 12, near the bottom of the device 10. Positioning the multi-sensor device 20 in the base 12 improves detection results as most of the movement of the device 10 during a kickback occurs at the bottom of the device 10. As discussed in further detail below, the multi-sensor device 20 performs kickback detection.

The multi-sensor device 20 includes one or more types of sensors including, but not limited to, an accelerometer and a gyroscope. The multi-sensor device 20 also includes its own onboard memory, and a processor or processing circuitry coupled to the onboard memory. The processor is configured to receive and process data generated by the sensors; and execute simple programs, such as finite state machines and decision tree logic, stored in the onboard memory. The processor discussed herein may include one or more processors.

In contrast to a general-purpose processor, the multi-sensor device 20 is a power-efficient, low-powered device, such as a smart sensor, that consumes between, for example, 1 and 3 microamps for computational requirements during processing. In another embodiment, the multi-sensor device 20 includes a high speed serial interface, such as a 13C serial interface, in which batched sensor data is shared to a micro controller unit, thus, reducing a wake-up period and saving current. As such, battery life of the device 10 is improved in case the power source 22 is a rechargeable battery.

The accelerometer and the gyroscope in the multi-sensor device 20 are 3-axis sensors that measure acceleration and angular velocity or rate, respectively, along the x-axis, y-axis, and the z-axis shown in FIG. 1. The x-axis extends in a horizontal direction through the motor 16 and the chuck 18 of the device 10. The y-axis extends in a horizontal direction and is transverse to the x-axis. The y-axis is in the same plane as the x-axis. The z-axis extends in a vertical direction and is transverse to the x-axis and the y-axis.

The various embodiments described will be discussed with respect to the axes shown in FIG. 1. However, other orientations of the axes are also possible.

A kickback of the device 10 is detected based on acceleration measurements and angular velocity measurements measured by the accelerometer and a gyroscope, respectively, of the multi-sensor device 20. When the device 10 is switched on, the device 10 vibrates and causes jitter in accelerometer and gyroscope data. In contrast, when a kickback of the device 10 occurs, there is a sudden change in acceleration and angular velocity of the device 10.

Figure 2:
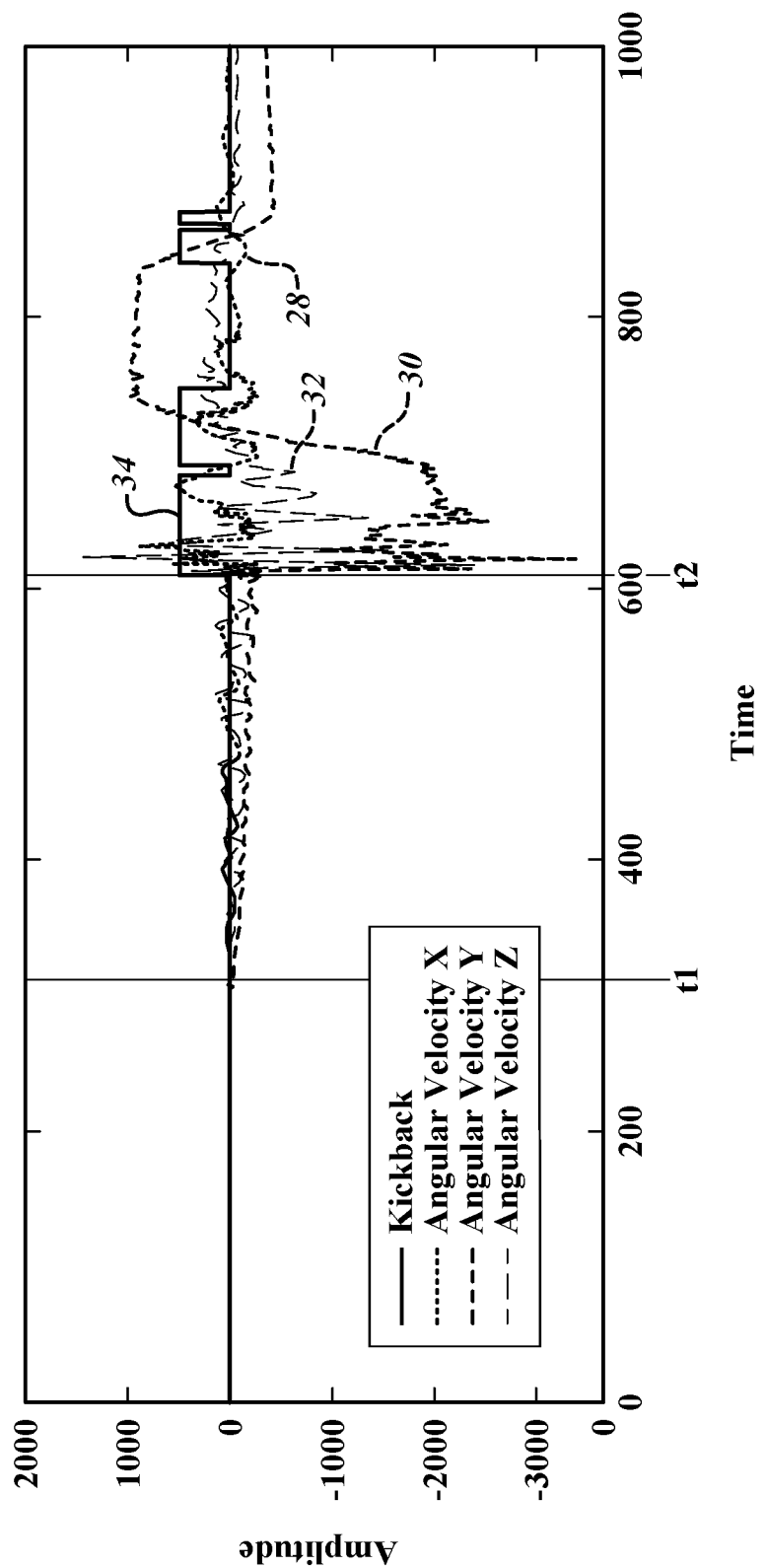
FIG. 2 shows angular velocity signals while a device performs a drilling operation and undergoes a kickback event according to an embodiment disclosed herein.

FIG. 2, for example, shows angular velocity signals 28, 30, 32 while the device 10 performs a drill/driving operation and undergoes a kickback event according to an embodiment disclosed herein. A kickback signal 34 is also shown in FIG. 2, which will be discussed in further detail below with respect to FIGS. 3 and 4.

The horizontal axis is a time axis, and the vertical axis is an amplitude axis. The time axis may have any time unit, such as milliseconds, seconds, or a number of samples. The amplitude axis may have any amplitude unit, such as a digital output value of the gyroscope that represents a measured angular velocity.

The angular velocity signals 28, 30, 32 are generated by the gyroscope of the multi-sensor device 20, and are along the x-axis, y-axis, and the z-axis, respectively, shown in FIG. 1.

The device 10 performs the drill/driving operation between times t1 and t2. As a result, the angular velocity signals 28, 30, 32 begin to jitter. Subsequently, at time t2, the kickback event occurs, and the angular velocity signals 28, 30, 32 have a sudden change and become erratic.

Acceleration signals generated by the accelerometer of the multi-sensor device 20 have similar signal profiles as the angular velocity signals 28, 30, 32 during the drill/driving operation and the kickback event.

Figure 3:
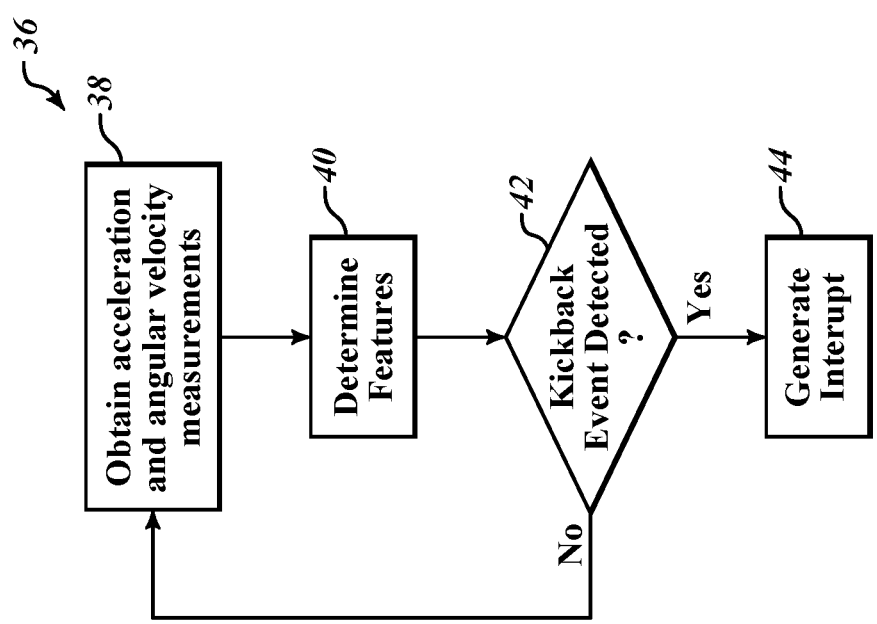
FIG. 3 is a block diagram for a method of detecting kickback according to an embodiment disclosed herein.

FIG. 3 is a block diagram for a method 36 of detecting kickback according to an embodiment disclosed herein.

The method 36 is executed by the device 10. More specifically, the method 36 is implemented as a program or a set of instructions for a decision tree which can be downloaded and stored in the onboard memory of the multi-sensor device 20, and is executed by the processor included in the multi-sensor device 20. It is also possible for the program for the method 36 to be stored in memory of the device 10, and executed by a general-purpose processor of the device 10. The method 36 may be executed at desired intervals.

In block 38, acceleration measurements and angular velocity measurements are generated by the accelerometer and a gyroscope, respectively, of the multi-sensor device 20, and are obtained by the processor of the multi-sensor device 20. The acceleration measurements and angular velocity measurements are along the x-axis, y-axis, and the z-axis shown in FIG. 2. In one embodiment, the acceleration measurements and angular velocity measurements are sampled between 950 and 970 hertz.

The processor of the multi-sensor device 20 obtains the acceleration measurements and angular velocity measurements for a current time window of a plurality of defined time windows. Stated differently, the processor of the multi-sensor device 20 obtains all of the acceleration measurements and angular velocity measurements generated in the current time window. In one embodiment, the plurality of time windows are equal in length. In one embodiment, each of the plurality of time windows, including the current time window, is between 9 and 11 milliseconds or measurement samples.

The method 36 then moves to block 40. In block 40, features or characteristics of the acceleration measurements and angular velocity measurements obtained in block 38 are determined by the processor of the multi-sensor device 20. As the acceleration measurements and angular velocity measurements are for the current time window, the features represent the acceleration measurements and angular velocity measurements in the current time window.

The features characterize the amplitude and the instability of the acceleration measurements and angular velocity measurements. For example, the multi-sensor device 20 determines, for each of the acceleration measurements and angular velocity measurements, at least one of the following calculations: an energy calculation (e.g., a total energy of acceleration/angular velocity measurements in a time window), a variance calculation (e.g., a variance of acceleration/angular velocity measurements in a time window), a norm variance calculation (e.g., a variance of a norm of acceleration/angular velocity measurements in a time window), a zero crossing calculation (e.g., a number of times acceleration/angular velocity measurements cross zero in a time window), a peak-to-peak calculation (e.g., a difference between the maximum amplitude and the minimum amplitude of acceleration/angular velocity measurements in a time window), a peak count calculation (e.g., a total number of peaks in acceleration/angular velocity measurements in a time window), a mean calculation (e.g., a mean of acceleration/angular velocity measurements in a time window), a maximum calculation (e.g., a maximum of acceleration/angular velocity measurements in a time window), or a minimum calculation (e.g., a minimum of acceleration/angular velocity measurements in a time window). Other types of calculations are also possible.

Different features, along different axes, may also be calculated for each of the acceleration measurements and angular velocity measurements. For example, in one embodiment, a norm variance calculation is determined for angular velocity measurements, a minimum calculation is determined for angular velocity measurements along the y-axis, and a mean calculation is determined for acceleration measurements along the y-axis.

The method 36 then moves to block 42. In block 42, the processor of the multi-sensor device 20 detects whether or not a kickback event has occurred based on the features of the acceleration measurements and angular velocity measurements determined in block 40. As the features of the acceleration measurements and angular velocity measurements are for the current time window, the kickback event is detected for the current time window.

The kickback event indicates the device 10 does not have enough power to continue operation due to, for example, the bit of the device 10 being stuck in a target material, and the device 10 itself is likely to kick back and spin. The detection of a kickback event will be discussed in further detail below with respect to FIG. 4.

In a case where a kickback event is not detected in block 42, the method 36 returns to block 38. Upon returning to block 38, acceleration measurements and angular velocity measurements are continued to be generated by the accelerometer and a gyroscope, respectively, of the multi-sensor device 20; and the processor of the multi-sensor device 20 obtains the acceleration measurements and angular velocity measurements for a subsequent time window of the plurality of time windows.

In a case where a kickback event is detected in block 42, the method 36 then moves to block 44. In block 44, the multi-sensor device 20 outputs an interrupt to the device 10 or writes to an output register signaling that a kickback event has occurred. For example, referring to FIG. 2, a kickback event is detected at time t2, and the kickback signal 34 is set to a high state. In response, the device 10 may momentarily halt operation of the device 10. For example, a general processor of the device 10 may slow or shut off the motor 16. The method 36 may then be halted until the device is reset or activated again. For example, referring to FIG. 2, the rise and falls of the kickback signal 34 may be ignored after being triggered at time t2.

As detection of a kickback event is performed for a current time window and may be repeated for the subsequent time window, detection of a kickback event may be performed at the end of every time window. Further, the detection may be completed before the subsequent time window begins. For example, in case each time window is 10 samples, detection of a kickback event is performed at the end of obtaining the $10^{th}$ sample and is completed before $11^{th}$ sample is obtained.

Figure 4:
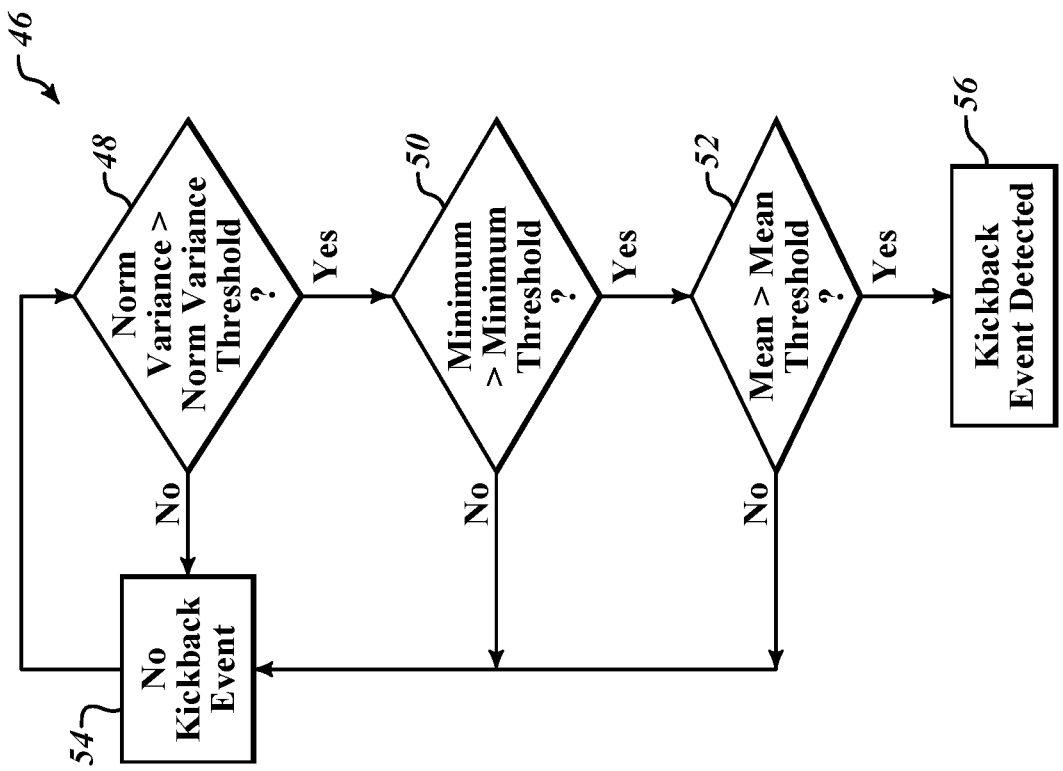
FIG. 4 is a block diagram for a method of detecting a kickback event according to an embodiment disclosed herein.

As discussed above with respect to block 42 of the method 36, the processor of the multi-sensor device 20 detects whether or not a kickback event has occurred based on the features of the acceleration measurements and angular velocity measurements determined in block 40. FIG. 4 is a block diagram for a method 46 of detecting a kickback event in block 40 according to an embodiment disclosed herein.

In blocks 48, 50, 52 the features of the acceleration measurements and angular velocity measurements determined in block 40 are compared to a plurality of thresholds indicative of a kickback event. A kickback event is detected in case one or more of the features are greater than (or less than) the plurality of thresholds.

The values of the plurality of thresholds are important for accurate detection of a kickback event in order to minimize detection latency in detecting a kickback event and minimize false detections of a kickback event. Utilizing large threshold values would increase the detection latency, while utilizing lower threshold values would trigger numerous false detections caused, by for example, noise from operation of the device.

As discussed above with respect to block 40, different features, along different axes, may be calculated for each of the acceleration measurements and angular velocity measurements. For exemplary purposes, it is assumed a norm variance calculation is determined for angular velocity measurements, a minimum calculation is determined for angular velocity measurements along the y-axis, and a mean calculation is determined for acceleration measurements along the y-axis are determined in block 40.

In block 48, the processor of the multi-sensor device 20 determines whether the norm variance calculation is greater than a norm variance threshold. In one embodiment, the norm variance threshold is between 2400 and 2600 degrees per second.

In case the norm variance calculation is not greater than (i.e., equal to or less than) the norm variance threshold, the method 46 moves to block 54. In block 54, a kickback event is not detected. As discussed above, the method 36 returns to block 38 in a case where a kickback event is not detected.

In case the norm variance calculation is greater than the norm variance threshold, the method 46 moves to block 50. In block 50, the processor of the multi-sensor device 20 determines whether the minimum calculation is greater than a minimum threshold. In one embodiment, the minimum threshold is between −35 and −25 degrees per second.

In case the minimum calculation is not greater than (i.e., equal to or less than) the minimum threshold, the method 46 moves to block 54. As discussed above, in block 54, a kickback event is not detected, and the method 36 then returns to block 38.

In case the minimum calculation is greater than the minimum threshold, the method 46 moves to block 52. In block 52, the processor of the multi-sensor device 20 determines whether the mean calculation is greater than a mean threshold. In one embodiment, the mean threshold is between 110 and 130 milli-g.

In case the mean calculation is not greater than (i.e., equal to or less than) the mean threshold, the method 46 moves to block 54. As discussed above, in block 54, a kickback event is not detected, and the method 36 then returns to block 38.

In case the mean calculation is greater than the mean threshold, the method 46 moves to block 56. In block 56, a kickback event is detected. As discussed above, the method 36 moves to block 44 in a case where a kickback event is detected.

It is possible to detect the kickback event based on determination in block 48, and without the determinations in blocks 50 and 52. In this case, a kickback event is not detected in response to the norm variance calculation being not greater than (i.e., equal to or less than) the norm variance threshold, and a kickback event is detected in response to the norm variance calculation being greater than the norm variance threshold. However, the likelihood of false detections of kickback events due to noise from operation of the device may increase. For example, referring to FIG. 2, the jitter of the angular velocity signals 28, 30, 32 between times t1 and t2 may incorrectly trigger a kickback event. Utilizing additional features to confirm a kickback event, such as blocks 50 and 52, minimizes false detections of kickback events. Stated differently, the additional features of blocks 50 and 52 filters or removes false kickback events detected by block 48.

As an example, block 48 is a root node that represents a starting point of the decision-making process; block 50 is an intermediate node that represents a decision based on a specific feature or attribute; and block 52 is a leaf node that represents an outcome or prediction, which in this case are two classes: kickback or no kickback. The root node qualifies a data point to be a kickback. The data point then passes through the intermediate and leaf nodes which filter false positives. Based on the feature or attribute and their values, the data point is classified to be a kickback or not.

The various embodiments disclosed herein provide a device and method for kickback detection based on gyroscope and accelerometer measurements. The kickback detection is performed in a low power multi-sensor device, and filters false kickback detections caused by signal noise from operation of the device.

A device, may be summarized as including: an accelerometer, which, in operation, generates acceleration measurements; a gyroscope, which, in operation, generates angular velocity measurements; processing circuitry, which, in operation, receives the acceleration measurements and the angular velocity measurements; and memory coupled to the processing circuitry, wherein, using the memory, the processing circuitry, in operation: determines at least one feature of the acceleration measurements for a current time window, the at least one feature of the acceleration measurements indicating an instability of the acceleration measurements; determines at least one feature of the angular velocity measurements for the current time window, the at least one feature of the angular velocity measurements indicating an instability of the angular velocity measurements; detects whether or not a kickback event of the device has occurred based on the at least one feature of the acceleration measurements for the current time window and the at least one feature of the angular velocity measurements for the current time window; and outputs an interrupt in response to detecting the kickback event of the device has occurred.

The device may be a power tool.

The processing circuitry, in operation: in response to detecting the kickback event of the device has not occurred, may determine at least one feature of the acceleration measurements for a subsequent time window, and may determine at least one feature of the angular velocity measurements for the subsequent time window; and may detect whether or not the kickback event of the device has occurred based on the at least one feature of the acceleration measurements for the subsequent time window and the at least one feature of the angular velocity measurements for the subsequent time window.

The current time window and the subsequent time window may be equal in length.

The processing circuitry may detect whether or not the kickback event of the device has occurred before the subsequent time window begins.

The at least one feature of the acceleration measurements for the current time window may include a mean of acceleration along a major axis, and the at least one feature of the angular velocity measurements for the current time window may include a minimum of angular velocity along the major axis and a norm variance of the angular velocity measurements.

The device may include a chuck and a motor, the accelerometer may generate acceleration measurements along a first axis extending through the chuck and the motor, a second axis extending in a horizontal direction transverse to the first axis, and a third axis extending in a vertical direction transverse to the first axis and the second axis, and the major axis may be the second axis.

The processing circuitry, in operation: may detect the kickback event of the device has occurred in case the minimum of angular velocity along the major axis exceeds a first threshold, the norm variance of the angular velocity measurements exceeds a second threshold, and the mean of acceleration along the major axis exceeds a third threshold.

The processing circuitry, in operation: may detect the kickback event of the device has not occurred in case the minimum of angular velocity along the major axis does not exceed the first threshold, the norm variance of the angular velocity measurements does not exceed the second threshold, or the mean of acceleration along the major axis does not exceed the third threshold.

The kickback event may indicate the device will experience a kickback.

The interrupt may stop operation of the device.

A method, may be summarized as including: generating, by an accelerometer, acceleration measurements; generating, by a gyroscope, angular velocity measurements; determining at least one feature of the acceleration measurements for a current time window, the at least one feature of the acceleration measurements indicating an instability of the acceleration measurements; determining at least one feature of the angular velocity measurements for the current time window, the at least one feature of the angular velocity measurements indicating an instability of the angular velocity measurements; detecting whether or not a kickback event of a device has occurred based on the at least one feature of the acceleration measurements for the current time window and the at least one feature of the angular velocity measurements for the current time window; and outputting an interrupt in response to detecting the kickback event of the device has occurred.

The method may further include: in response to detecting the kickback event of the device has not occurred, determining at least one feature of the acceleration measurements for a subsequent time window, and determining at least one feature of the angular velocity measurements for the subsequent time window; and detecting whether or not the kickback event of the device has occurred based on the at least one feature of the acceleration measurements for the subsequent time window and the at least one feature of the angular velocity measurements for the subsequent time window.

The current time window and the subsequent time window may be equal in length.

The at least one feature of the acceleration measurements for the current time window may include a mean of acceleration along a major axis, and the at least one feature of the angular velocity measurements for the current time window may include a minimum of angular velocity along the major axis and a norm variance of the angular velocity measurements.

The method may further include: detecting the kickback event of the device has occurred in case the minimum of angular velocity along the major axis exceeds a first threshold, the norm variance of the angular velocity measurements exceeds a second threshold, and the mean of acceleration along the major axis exceeds a third threshold.

The method may further include: detecting the kickback event of the device has not occurred in case the minimum of angular velocity along the major axis does not exceed the first threshold, the norm variance of the angular velocity measurements does not exceed the second threshold, or the mean of acceleration along the major axis does not exceed the third threshold.

A device, may be summarized as including: an accelerometer configured to generate acceleration measurements; a gyroscope configured to generate angular velocity measurements; and a processor configured to: determine characteristics of the acceleration measurements and the angular velocity measurements for a first time window, the characteristics of the acceleration measurements and the angular velocity measurements for the first time window indicating an instability of the acceleration measurements during the first time window; determine whether or not a kickback event of the device has occurred based on the characteristics of the acceleration measurements and the angular velocity measurements for the first time window; in case the kickback event of the device is determined to have occurred, output an interrupt indicating the kickback event of the device has occurred; and in case the kickback event of the device is determined to not have occurred, determine characteristics of the acceleration measurements and the angular velocity measurements for a second time window subsequent to the first time window, the characteristics of the acceleration measurements and the angular velocity measurements for the second time window indicating an instability of the acceleration measurements during the second time window, and determine whether or not the kickback event of the device has occurred based on the characteristics of the acceleration measurements and the angular velocity measurements for the second time window.

The characteristics of the acceleration measurements and the angular velocity measurements for the first time window may include a mean of acceleration along a major axis, a minimum of angular velocity along the major axis, and a norm variance of the angular velocity measurements.

The first time window and the second time window may be equal in length.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
an accelerometer, which, in operation, generates acceleration measurements;
a gyroscope, which, in operation, generates angular velocity measurements;
processing circuitry, which, in operation, receives the acceleration measurements and the angular velocity measurements; and
memory coupled to the processing circuitry, wherein, using the memory, the processing circuitry, in operation:
determines at least one feature of the acceleration measurements for a current time window, the at least one feature of the acceleration measurements for the current time window includes a mean of acceleration along a major axis;
determines at least one feature of the angular velocity measurements for the current time window, the at least one feature of the angular velocity measurements for the current time window includes a minimum of angular velocity along the major axis and a norm variance of the angular velocity measurements;
detects whether or not a kickback event of the device has occurred based on the at least one feature of the acceleration measurements for the current time window and the at least one feature of the angular velocity measurements for the current time window; and
outputs an interrupt or writes to an output register in response to detecting the kickback event of the device has occurred.

2. The device of claim 1 wherein the device is a power tool.

3. The device of claim 1 wherein the processing circuitry, in operation:
in response to detecting the kickback event of the device has not occurred,
determines at least one feature of the acceleration measurements for a subsequent time window, and
determines at least one feature of the angular velocity measurements for the subsequent time window; and
detects whether or not the kickback event of the device has occurred based on the at least one feature of the acceleration measurements for the subsequent time window and the at least one feature of the angular velocity measurements for the subsequent time window.

4. The device of claim 3 wherein the current time window and the subsequent time window are equal in length.

5. The device of claim 3 wherein the processing circuitry detects whether or not the kickback event of the device has occurred before the subsequent time window begins.

6. The device of claim 1 wherein
the device includes a chuck and a motor,
the accelerometer generates acceleration measurements along a first axis extending through the chuck and the motor, a second axis extending in a horizontal direction transverse to the first axis, and a third axis extending in a vertical direction transverse to the first axis and the second axis, and the major axis is the second axis.

7. The device of claim 1 wherein the processing circuitry, in operation:

detects the kickback event of the device has occurred in case the minimum of angular velocity along the major axis exceeds a first threshold, the norm variance of the angular velocity measurements exceeds a second threshold, and the mean of acceleration along the major axis exceeds a third threshold.

8. The device of claim 7 wherein the processing circuitry, in operation:

detects the kickback event of the device has not occurred in case the minimum of angular velocity along the major axis does not exceed the first threshold, the norm variance of the angular velocity measurements does not exceed the second threshold, or the mean of acceleration along the major axis does not exceed the third threshold.

9. The device of claim 1 wherein the kickback event indicates the device will experience a kickback.

10. The device of claim 1 wherein the interrupt stops operation of the device.

11. A method, comprising:

generating, by an accelerometer, acceleration measurements;

generating, by a gyroscope, angular velocity measurements;

determining at least one feature of the acceleration measurements for a current time window, the at least one feature of the acceleration measurements for the current time window includes a mean of acceleration along a major axis;

determining at least one feature of the angular velocity measurements for the current time window, the at least one feature of the angular velocity measurements for the current time window includes a minimum of angular velocity along the major axis and a norm variance of the angular velocity measurements;

detecting whether or not a kickback event of a device has occurred based on the at least one feature of the acceleration measurements for the current time window and the at least one feature of the angular velocity measurements for the current time window; and outputting an interrupt or writing to an output register in response to detecting the kickback event of the device has occurred.

12. The method of claim 11, further comprising:

in response to detecting the kickback event of the device has not occurred, determining at least one feature of the acceleration measurements for a subsequent time window, and determining at least one feature of the angular velocity measurements for the subsequent time window; and detecting whether or not the kickback event of the device has occurred based on the at least one feature of the acceleration measurements for the subsequent time window and the at least one feature of the angular velocity measurements for the subsequent time window.

13. The method of claim 12 wherein the current time window and the subsequent time window are equal in length.

14. The method of claim 11, further comprising:

detecting the kickback event of the device has occurred in case the minimum of angular velocity along the major axis exceeds a first threshold, the norm variance of the angular velocity measurements exceeds a second threshold, and the mean of acceleration along the major axis exceeds a third threshold.

15. The method of claim 11, further comprising:

detecting the kickback event of the device has not occurred in case the minimum of angular velocity along the major axis does not exceed a first threshold, the norm variance of the angular velocity measurements does not exceed a second threshold, or the mean of acceleration along the major axis does not exceed a third threshold.

16. A device, comprising:

an accelerometer configured to generate a first plurality of acceleration measurements in a first time window and a second plurality of acceleration measurements in a second time window;

a gyroscope configured to generate a first plurality of angular velocity measurements in the first time window and a second plurality of angular velocity measurements in the second time window; and a processor configured to:

determine characteristics of the first plurality of acceleration measurements and the first plurality of angular velocity measurements in the first time window;

determine whether or not a kickback event of the device has occurred based on the characteristics of the first plurality of acceleration measurements and the first plurality of angular velocity measurements in the first time window;

in case the kickback event of the device is determined to have occurred, output an interrupt indicating the kickback event of the device has occurred; and in case the kickback event of the device is determined to not have occurred, determine characteristics of the second plurality of acceleration measurements and the second plurality of angular velocity measurements in the second time window subsequent to the first time window, and determine whether or not the kickback event of the device has occurred based on the characteristics of the second plurality of acceleration measurements and the second plurality of angular velocity measurements in the second time window.

17. The device of claim 16 wherein the characteristics of the acceleration measurements and the angular velocity measurements for the first time window include a mean of acceleration along a major axis, a minimum of angular velocity along the major axis, and a norm variance of the angular velocity measurements.

18. The device of claim 16 wherein the first time window and the second time window are equal in length.

19. The device of claim 16 wherein the characteristics of the acceleration measurements and the angular velocity measurements for the first time window include at least one of an energy calculation, a variance calculation, a norm variance calculation, a zero crossing calculation, a peak-to-peak calculation, a peak count calculation, a mean calculation, a maximum calculation, or a minimum calculation.

* * * * *